(12) United States Patent
Nakamura

(10) Patent No.: US 7,742,645 B2
(45) Date of Patent: Jun. 22, 2010

(54) ENCODING DEVICE AND METHOD

(75) Inventor: Sou Nakamura, Yokohama (JP)

(73) Assignee: Fujitsu Microelectronics Limited, Yokohama (JP)

( * ) Notice: Subject to any disclaimer, the term of this patent is extended or adjusted under 35 U.S.C. 154(b) by 915 days.

(21) Appl. No.: 11/550,436

(22) Filed: Oct. 18, 2006

(65) Prior Publication Data

US 2007/0217695 A1 Sep. 20, 2007

(30) Foreign Application Priority Data

Feb. 28, 2006 (JP) ............... 2006-053619

(51) Int. Cl.
  *G06K 9/36* (2006.01)
  *H04B 1/66* (2006.01)
  *H04N 1/32* (2006.01)
  *H04N 7/12* (2006.01)

(52) U.S. Cl. .............. 382/232; 375/240; 358/426.01; 358/539; 348/384.1

(58) Field of Classification Search ......... 382/232–253; 348/384.1–440.1; 358/539, 426.01–426.16; 375/240, 240.01–240.29
See application file for complete search history.

(56) References Cited

U.S. PATENT DOCUMENTS

| | | | | |
|---|---|---|---|---|
| 5,327,502 A | * | 7/1994 | Katata et al. ............ | 382/239 |
| 5,617,145 A | * | 4/1997 | Huang et al. ............ | 348/423.1 |
| 6,118,900 A | * | 9/2000 | Yokose et al. ............ | 382/234 |
| 6,330,666 B1 | * | 12/2001 | Wise et al. ............ | 382/246 |
| 6,373,412 B1 | * | 4/2002 | Mitchell et al. ............ | 382/232 |
| 6,545,618 B2 | | 4/2003 | Yip | |
| 6,650,782 B1 | * | 11/2003 | Joshi et al. ............ | 382/239 |
| 6,947,484 B2 | * | 9/2005 | Inagaki et al. ............ | 375/240.02 |
| 7,050,640 B1 | * | 5/2006 | Acharya et al. ............ | 382/240 |
| 7,177,477 B2 | * | 2/2007 | Spasojevic ............ | 382/240 |
| 7,301,485 B2 | * | 11/2007 | Senda ............ | 382/247 |
| 2002/0027516 A1 | * | 3/2002 | Yip ............ | 341/107 |
| 2002/0196859 A1 | | 12/2002 | Taniguchi | |
| 2003/0035476 A1 | | 2/2003 | Ohyama et al. | |

FOREIGN PATENT DOCUMENTS

| | | |
|---|---|---|
| JP | 2002-159009 A | 5/2002 |
| JP | 2003-8906 A | 1/2003 |
| JP | 2003-32496 A | 1/2003 |
| JP | 2005-341368 A | 12/2005 |

OTHER PUBLICATIONS

"Novel Word-Level Algorithm of Embedded Block Coding in JPEG 2000", Fang et al, *IEEE*, 2003, pp. I-137 to I-140.

* cited by examiner

*Primary Examiner*—Manav Seth
(74) *Attorney, Agent, or Firm*—Arent Fox LLP

(57) ABSTRACT

The encoding device of the present invention comprises a type determination unit inputs each bit of the weblet coefficient in a depth direction in parallel and determines type information indicating which the bit is, the first "1" bit when viewed from an MSB side, a bit located further on the MSB side than the first "1" bit, a bit located further on an LSB side than the first "1" bit, a buffer unit for buffering the determined type information of each bit for each bit depth and a pass determination unit for determining pass information of a type information to process, of a plurality of pieces of type information, based on the plurality of pieces of buffered type information of the same depth.

13 Claims, 27 Drawing Sheets

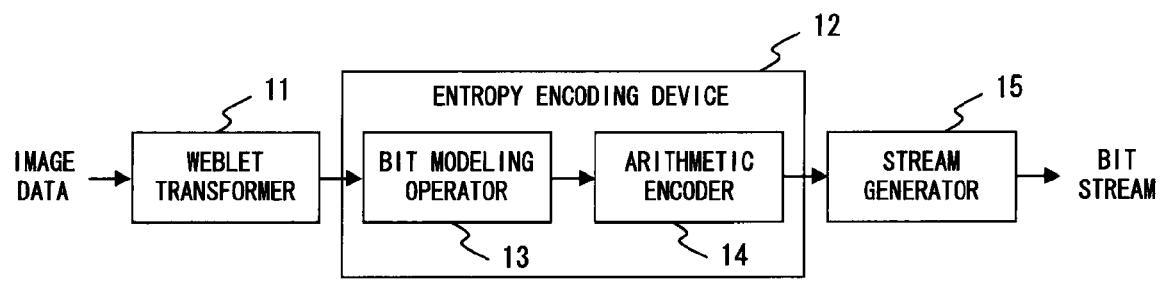
F I G. 1

| D0 | V0 | D1 |
|----|----|----|
| H0 | X  | H1 |
| D2 | V1 | D3 |

X : BIT TO PROCESS

F I G. 2

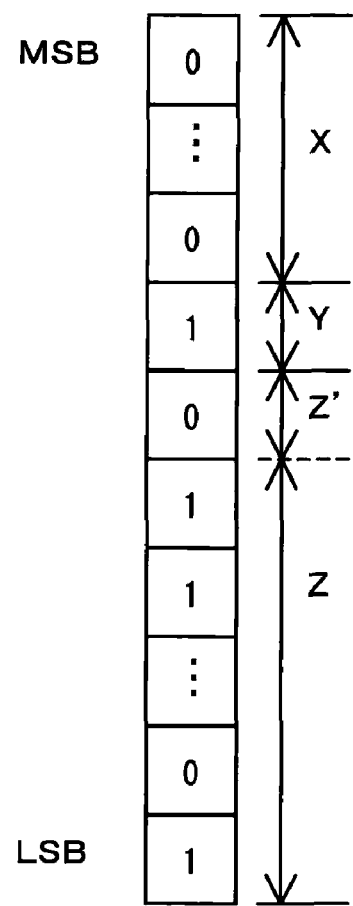
F I G. 8 A

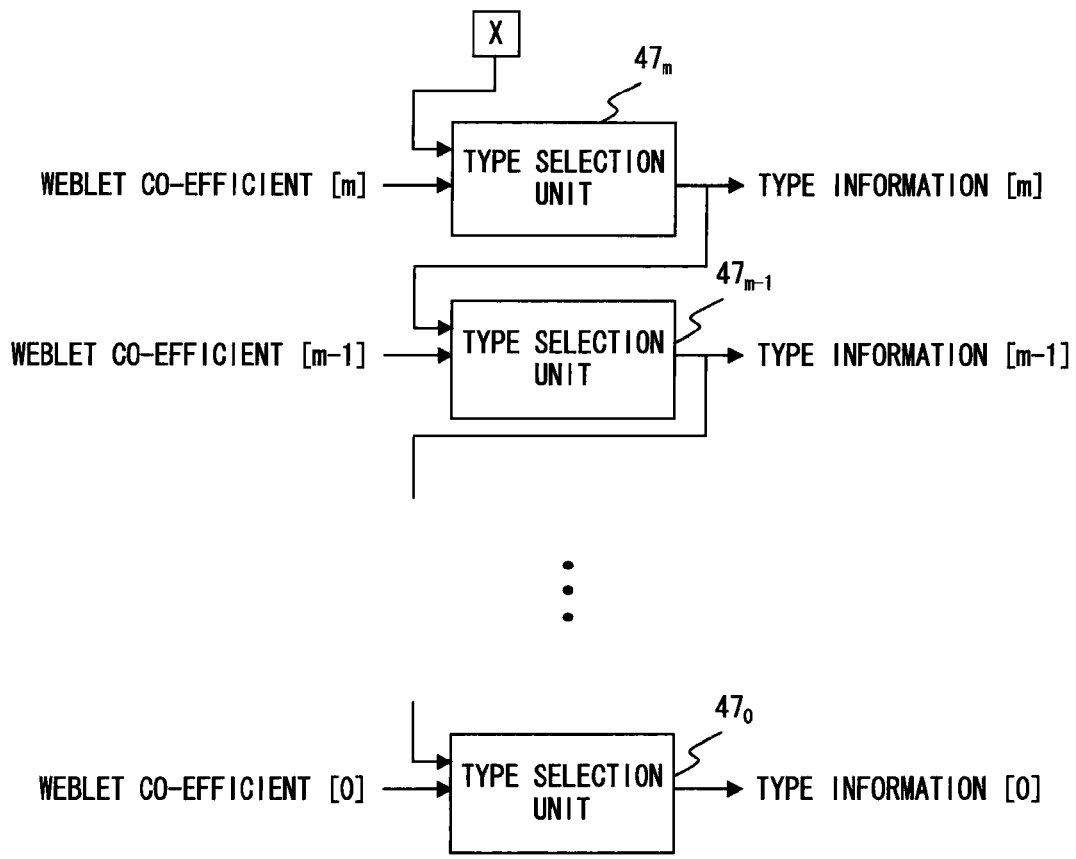
"m" IS THE BIT DEPTH OF A WEBLET CO-EFFICIENT
F I G. 8 B

| THE FORMER STAGE OUTPUT | INPUTTED BIT | OUTPUT |
|---|---|---|
| X | 0 | X |
| X | 1 | Y |
| Y | — | Z' |
| Z' | — | Z |
| Z | — | Z |

F I G. 8 C

| 0 | 4 | 8 | 12 | 16 | 20 | 24 | 28 |
|---|---|---|---|---|---|---|---|
| 1 | 5 | 9 | 13 | 17 | 21 | 25 | 29 |
| 2 | 6 | 10 | 14 | 18 | 22 | 26 | 30 |
| 3 | 7 | 11 | 15 | 19 | 23 | 27 | 31 |
| 32 | 36 | 40 | 44 | 48 | 52 | 56 | 60 |
| 33 | 37 | 41 | 45 | 49 | 53 | 57 | 61 |
| 34 | 38 | 42 | 46 | 50 | 54 | 58 | 62 |
| 35 | 39 | 43 | 47 | 51 | 55 | 59 | 63 |
| 64 | 68 | 72 | 76 | 80 | 84 | 88 | 92 |
| 65 | 69 | 73 | 77 | 81 | 85 | 89 | 93 |
| 66 | 70 | 74 | 78 | 82 | 86 | 90 | 94 |
| 67 | 71 | 75 | 79 | 83 | 87 | 91 | 95 |

FIG. 11A

| 0 | 4 | 8 | 12 | 16 | 20 | 24 | 28 |
|---|---|---|---|---|---|---|---|
| 1 | 5 | 9 | 13 | 17 | 21 | 25 | 29 |
| 2 | 6 | 10 | 14 | 18 | 22 | 26 | 30 |
| 3 | 7 | 11 | 15 | 19 | 23 | 27 | 31 |
| 32 | 36 | 40 | 44 | 48 | 52 | 56 | 60 |
| 33 | 37 | 41 | 45 | 49 | 53 | 57 | 61 |
| 34 | 38 | 42 | 46 | 50 | 54 | 58 | 62 |
| 35 | 39 | 43 | 47 | 51 | 55 | 59 | 63 |
| 64 | 68 | 72 | 76 | 80 | 84 | 88 | 92 |
| 65 | 69 | 73 | 77 | 81 | 85 | 89 | 93 |
| 66 | 70 | 74 | 78 | 82 | 86 | 90 | 94 |
| 67 | 71 | 75 | 79 | 83 | 87 | 91 | 95 |

F I G.  1 1 B

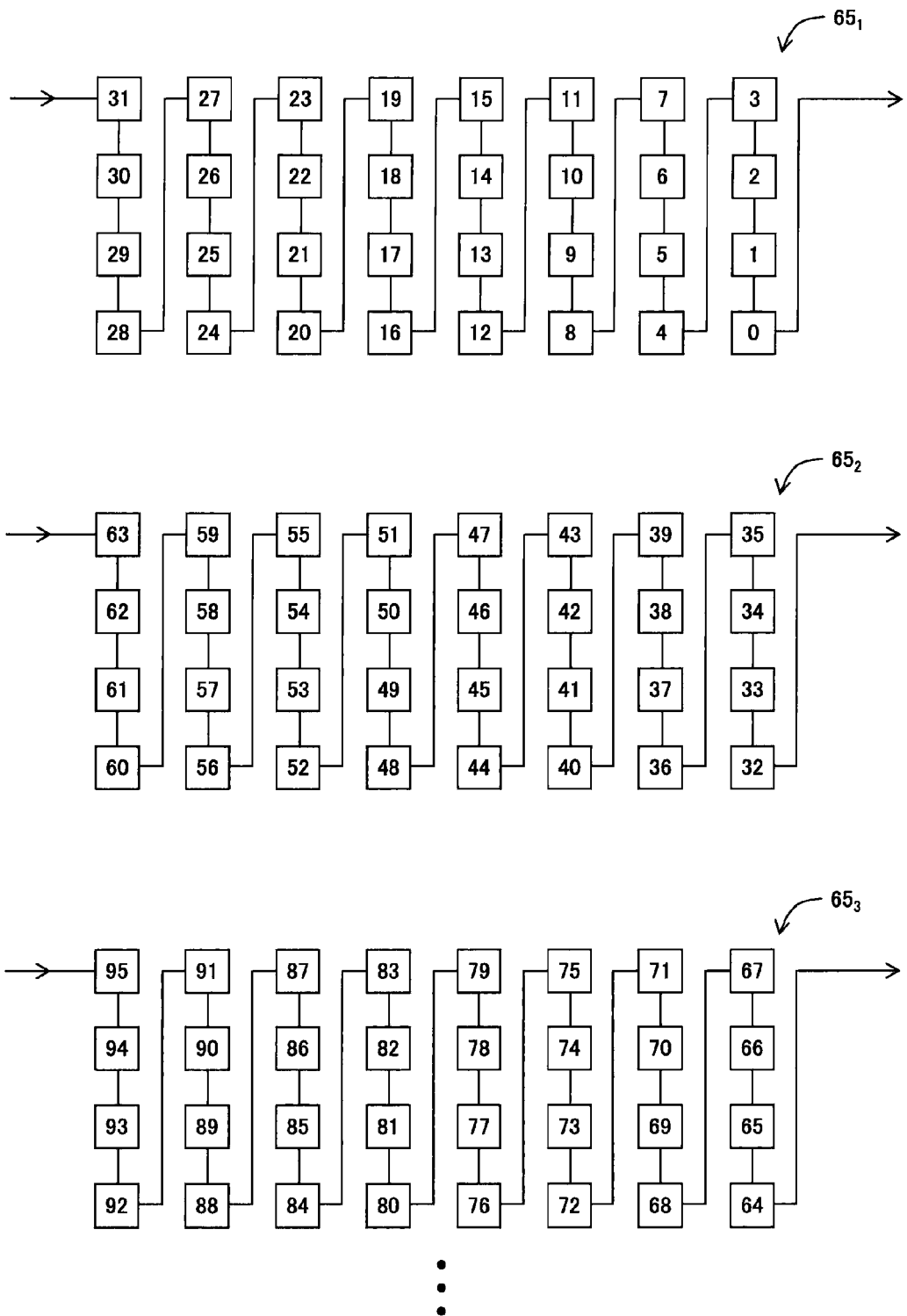
F I G. 1 2 A

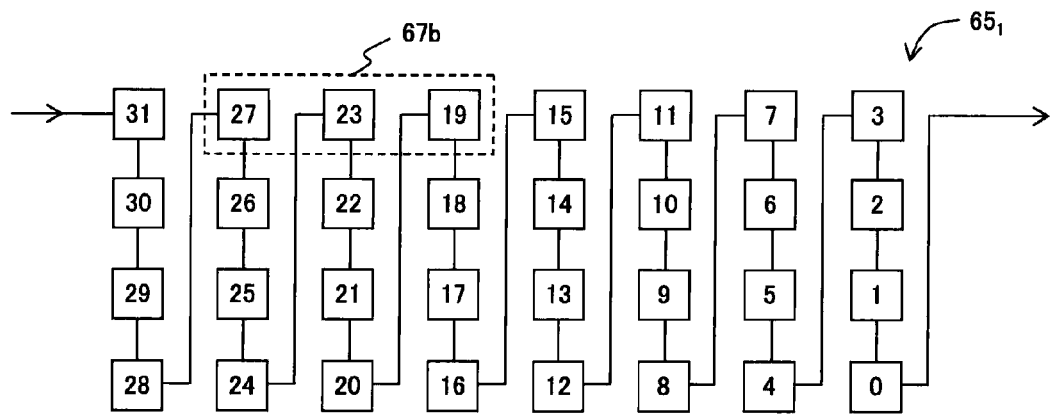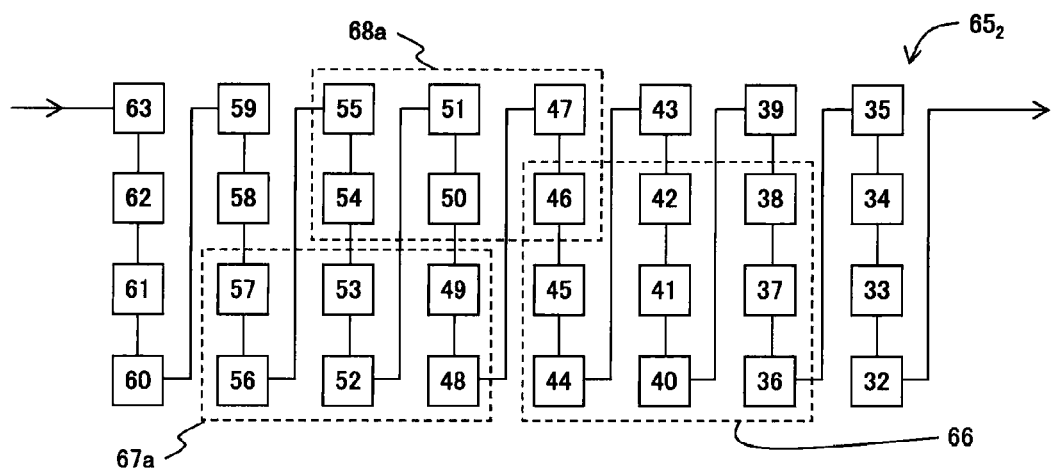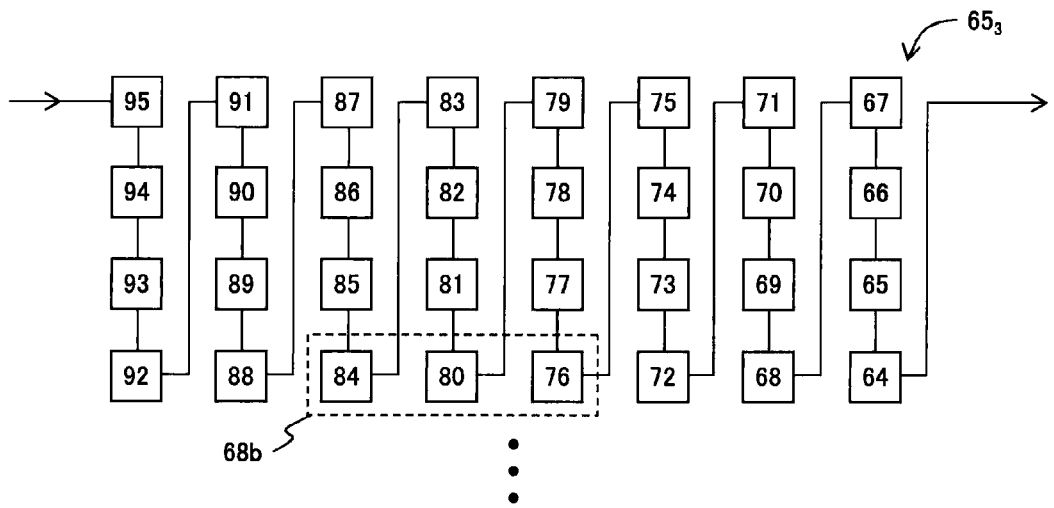
FIG. 12B

| PROCESSING ORDER OF NB(i) AGAINST C | TYPE OF NB(i) | | |
|---|---|---|---|
| | X | Y | Z or Z' |
| POST-PROCESS | NON-SIGNIFICANT | NON-SIGNIFICANT | SIGNIFICANT |
| PRE-PROCESS | NON-SIGNIFICANT | ※ | SIGNIFICANT |

※ IF THE PASS INFORMATION OF NB(i) IS AN SP PASS,
IT IS SIGNIFICANT. IF NOT, IT IS NON-SIGNIFICANT.

FIG. 14A

| NB (0) | NB (3) | NB (5) |
|--------|--------|--------|
| NB (1) | C      | NB (6) |
| NB (2) | NB (4) | NB (7) |

C : BIT TO PROCESS
NB(i) : 8 NEIGHBOR BITS OF C

F I G. 1 4 B

[ 21    17    13 ] ~~ 84'

[ 59    55    51 ] ~~ 82a

[ 58    54    50 ] ~~ 82b

[ 57    53    49 ] ~~ 82c

[ 95    91    87 ] ~~ 83'

F I G.  1 6

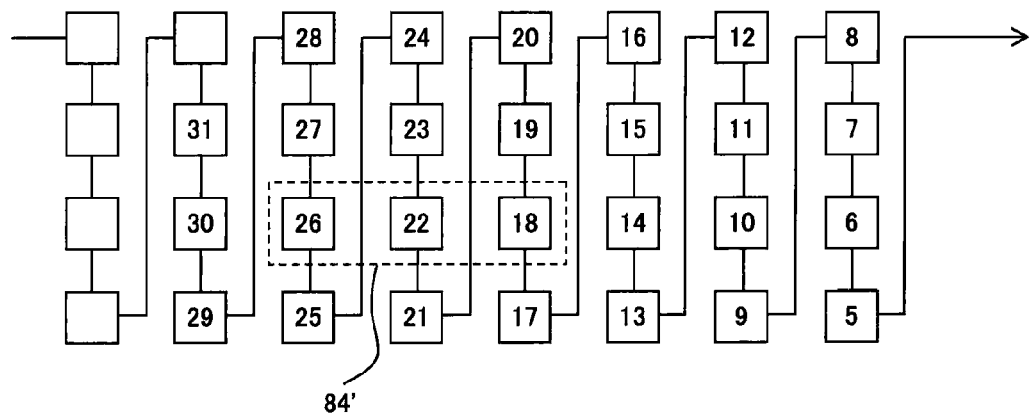
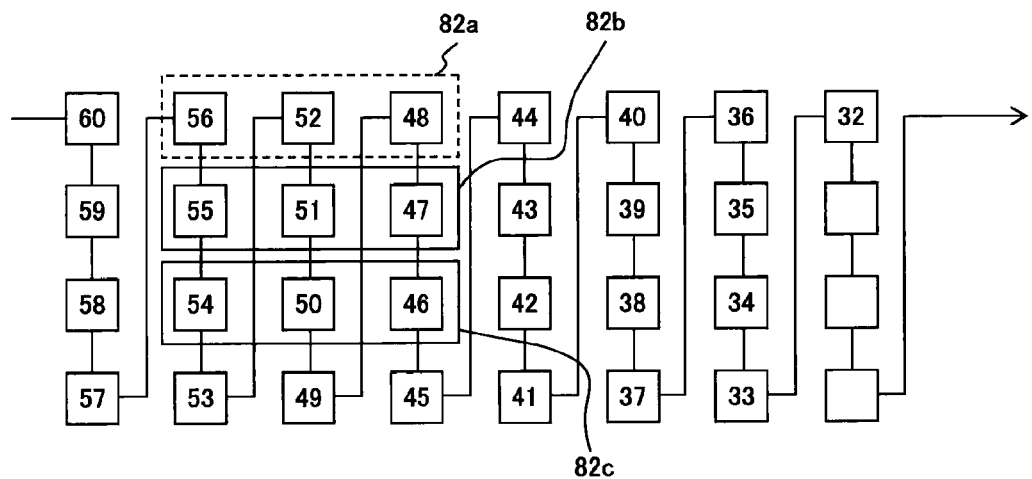
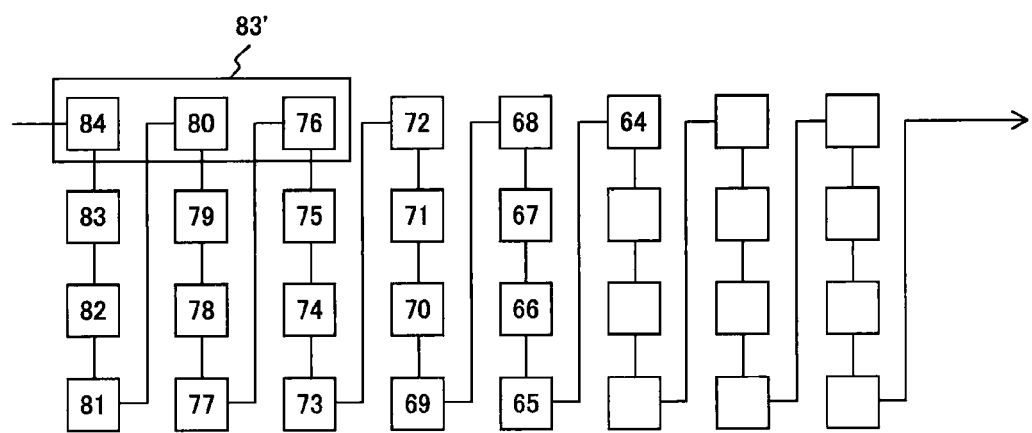
F I G. 1 8

ENCODING DEVICE AND METHOD

CROSS REFERENCE TO RELATED APPLICATIONS

This application is based upon and claims the benefit of priority from the prior Japanese Patent Application No. 2006-053619 filed on Feb. 28, 2006, the entire contents of which are incorporated herein by reference.

BACKGROUND OF THE INVENTION

1. Field of the Invention

The present invention relates to an encoding device and its method, and more particularly relates to an encoding device and its method which adopt joint photographic experts group (JPEG) 2000 specification.

2. Description of the Related Art

As an image compression specification, JPEG 2000 is known. One of the features of the JPEG 2000 encoding method is that a co-efficient bit modeling process and an arithmetic encoding process are applied to a wavelet co-efficient obtained by wavelet transform. The encoded data obtained thus is outputted as a bit stream via a stream generator.

For example, Non-patent reference 1 discloses an algorithm capable of encoding a code block only by scanning the code block twice.

Furthermore, for example, Patent references 1, 2, 3 and 4 disclose a technology for performing the co-efficient bit modeling process in high speed.

Non-patent reference 1: Hung-Chi Fang, Tu-Chih Wang, Yu-Wei Chang, Ya-Yuh Shih and Liang-Gee Chen, "Novel Word-level Algorithm of Embedded Block Coding in JPEG 2000", Graduate Institute of Electronics Engineering and Department of Electrical Engineering, National Taiwan University Patent reference 1: Japanese Patent Application Publication No. 2005-341368 "Bit Modeling Operator"

Patent reference 2: Japanese Patent Application Publication No. 2003-8906 "Bit Modeling Processing Method and Circuit Using it"

Patent reference 3: Japanese Patent Application Publication No. 2003-32496 "Image Coding Device and Method"

Patent reference 4: Japanese Patent Application Publication No. 2002-159009 "Entropy Encoding/decoding Method and Device"

SUMMARY OF THE INVENTION

It is an object of the present invention to provide an encoding device capable of performing a bit modeling process in high speed and its method.

The encoding device in the first aspect of the present invention outputs encoded data, based on the weblet co-efficient obtained by weblet transform. The encoding device comprises a type determination unit for inputting each bit of the weblet co-efficient in the depth direction in parallel and determining type information indicating which the bit is, the first "1" bit when viewed from MSB side, a bit located further on the MSB side than the first "1" bit or a bit further located on the LSB side than the first "1" bit, a buffer unit for buffering the determined type information of each bit for each bit depth, a pass determination unit for determining the pass information of a type information to process, of a plurality of pieces of type information, based on the plurality of pieces of buffered type information of the same depth, a context generation unit for generating a context, based on the type information outputted from the buffer unit and the pass information determined for the plurality of pieces of type information, and an arithmetic encoding unit for performing arithmetic encoding, based on the generated context.

In this case, the type information obtained the type determination unit processing each bit of the weblet co-efficient in the depth direction in parallel is buffered in the buffer unit for each bit depth and the pass determination unit determines the pass information of a plurality of pieces of the type information, based on the plurality of pieces of the buffered type information. Then, the context generation unit generates a context, based on the determined pass information of the plurality of pieces of the type information.

Therefore, processes after that of the buffer unit can be performed for each bit plane in parallel, thereby improving the speed of the bit modeling process.

In the encoding device in the first aspect of the present invention, the type determination unit can be provided for each stripe corresponding to each bit plane constituting a code block. The buffer unit, the pass determination unit and the context generation unit can be provided for each bit plane and also for each stripe in the bit plane. The starting time of the process of inputting each bit of the weblet co-efficient in the depth direction in parallel of the type determination unit can also be slid, according to the position of the relevant stripe in the bit plane.

Thus, when processing one bit plane, the stripes can be processed almost in parallel, thereby further improving the speed of the bit modeling process.

The encoding device in the second aspect of the present invention outputs encoded data, based on the weblet co-efficient indicated by a significant state variable obtained by weblet transform. The encoding device comprises a type determination unit for inputting each bit of the weblet co-efficient in the depth direction in parallel and determining type information indicating which each bit is, the first significant bit when viewed from MSB side, a bit located on the MSB side than the first significant bit or a bit located further on the further LSB side than the first significant bit, a buffer unit for buffering the determined type information of each bit for each bit depth, a pass determination unit for determining pass information of type information to process, of a plurality of pieces of type information, based on the plurality of pieces of buffered type information of the same depth, a context generation unit for generating a context, based on the type information outputted from the buffer unit and the pass information determined for the plurality of pieces of type information, and an arithmetic encoding unit for performing arithmetic encoding, based on the generated context.

The encoding method in the third aspect of the present invention outputs encoded data, based on the weblet co-efficient of the process result of weblet transform. The encoding method comprises a type determination step of inputting each bit of the weblet co-efficient in the depth direction in parallel and determining type information indicating which each bit is, the first "1" bit when viewed from MSB side, a bit located further on the MSB side than the first "1" bit or a bit located on the further LSB side than the first "1" bit, a buffering step of buffering the determined type information of each bit for each bit depth, a pass determination step of determining pass information of type information to process, of a plurality of pieces of type information, based on the plurality of pieces of buffered type information of the same depth, a context generation step of generating a context, based on the type information outputted from the buffer unit and the pass information determined for the plurality of pieces of type information, and an arithmetic encoding step of performing arithmetic encoding, based on the generated context.

According to the present invention, processes after that of the buffer unit can be performed for each bit plane in parallel, thereby improving the speed of the bit modeling process.

BRIEF DESCRIPTION OF THE DRAWINGS

FIG. 1 shows the configuration of the encoding device adopting JPEG 2000 specifications;

Figure 2:
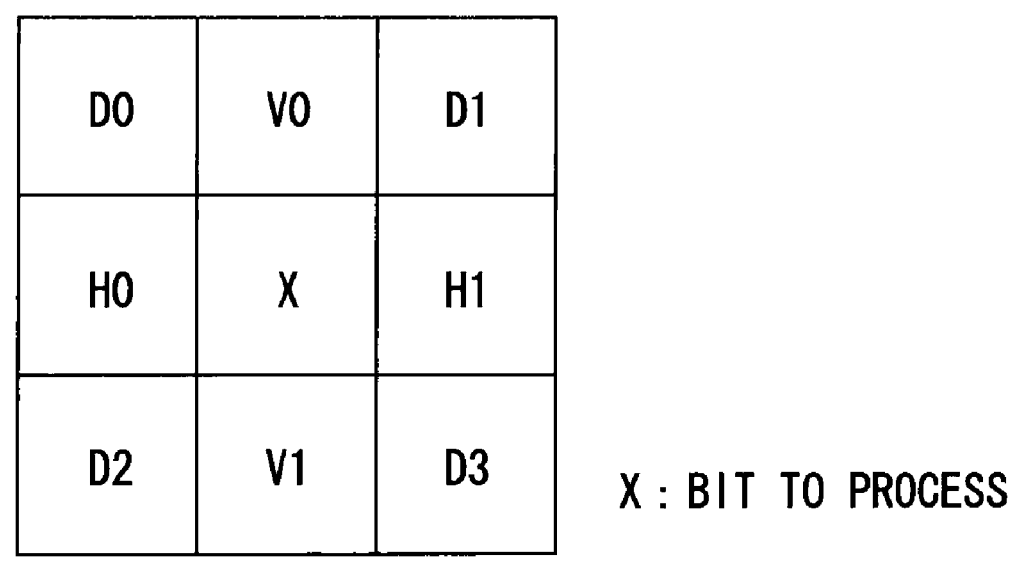

FIG. 2 shows a bit to process and its eight neighbor bits;

FIG. 8A explains the type of type information;

FIG. 8B shows the hardware configuration of a type classifier;

FIG. 8C is a table for showing logic built in each type selection unit shown in FIG. 8B;

FIG. 11A shows one example of the bits of three consecutive stripes on a bit plane;

FIG. 11B shows three areas on the bit plane shown in FIG. 11A;

FIG. 12A shows the state in which type information of each bit shown in FIG. 11A is stored in the three stripe buffers;

FIG. 12B shows areas on the stripe buffer corresponding to the three areas shown in FIG. 11B;

FIG. 14A is a table for determining the significance/non-significance of eight neighbor bits of a bit "C" to process shown in FIG. 14B, based on the type information of the eight neighbor bits, the information about each of the eight neighbor bits, indicating whether each of the eight neighbor bits is to be processed before or after the bit to process;

FIG. 14B shows the bit to process "C" and its eight neighbor bits "NB(0)"~"NB(7)";

FIG. 16 explains the eight-neighbor bit selection process performed on the input side of the eight neighbor significant state generation unit shown in FIG. 13;

FIG. 18 shows an example of eight selected neighbor bits (No. 2);

DESCRIPTION OF THE PREFERRED EMBODIMENTS

Figure 3A:
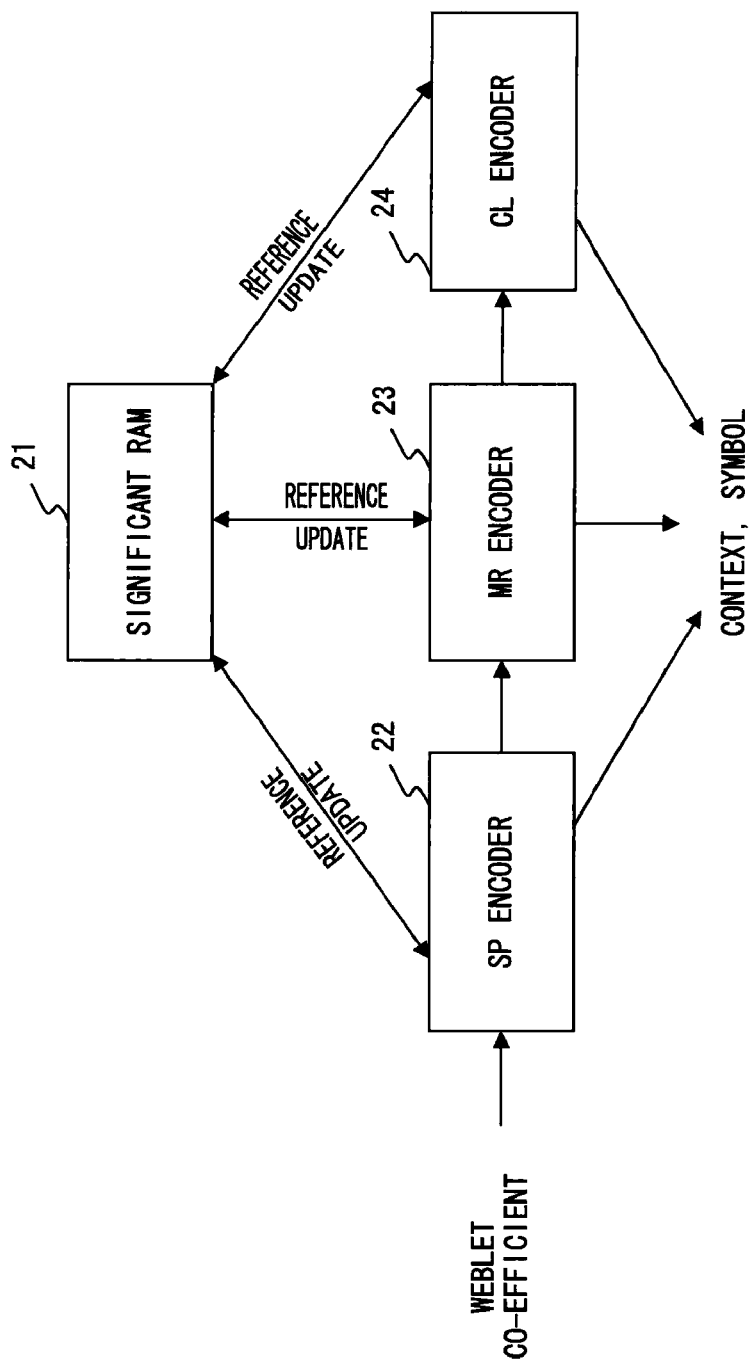
FIG. 3A explains the summary of the conventional bit modeling process (No. 1)

The preferred embodiments of the present invention are described in detail below with reference to the drawings.

The encoding device of each of the preferred embodiments adopts JPEG 2000 specifications.

FIG. 1 shows the configuration of the encoding device adopting JPEG 2000 specifications.

In FIG. 1, a weblet transformer 11 inputs image data, applies weblet transform to the inputted data and outputs a weblet co-efficient to an entropy encoder 12 as a result of the process.

The entropy encoder 12 comprises a bit modeling operator 13 and an arithmetic encoder 14. The entropy encoder 12 receives a plurality of bit planes (code blocks) where bits of the quantized value of a pixel (weblet co-efficient) are stored from the most significant bit (MSB) side to the least significant bit (LSB) side in the depth direction as the process result of weblet transfer, applies a bit modeling process to the bit planes, and transfer a context and a symbol (each bit value of a weblet co-efficient) to the arithmetic encoder 14 as the process result. In this case, the bit plane is a plane on which bits with the same depth are collected.

The arithmetic encoder 14 applies arithmetic encoding to the context and symbol. The arithmetically encoded data (encoded data) is outputted via a stream generator 15 as a bit stream.

In order to compare it with the processing method of this preferred embodiment, the conventional bit modeling processing method is described below.

Conventionally, in the bit modeling process, the pass information of each bit on the bit plane is determined. The context of a bit to process is calculated based on the pass information and the value of the significant state variable of the eight neighbor bits of the bit to process (having a significant/non-significant value; usually significant="1" and non-significant="0").

In this case, the significant state is a state defined for each bit. When viewing each bit of the quantized weblet co-efficient from the MSB side to the LSB side, each bit located further on the MSB side than the first "1" bit and each bit located further on the LSB side than the first "1" bit are determined to be non-significant and significant, respectively.

The first "1" bit can be significant or non-significant. Specifically, if bits which are processed before the first "1" bit among the eight neighbor bits of the first "1" bit include a (at least one) bit whose pass information is an SP pass, which is described later, the first "1" bit is defined to be significant. Otherwise, the first "1" bit is defined to be non-significant.

The pass includes the following three types.

Significance Propagation (SP) Pass:

If in the bit plane of the depth of the first bit having value "1" (the bit to process) among each bit of a quantized wavelet co-efficient, there is at least one significant bit in the eight neighbor bits shown in FIG. 2 of the first bit having value "1", the first bit having value "1" is classified into an SP pass. If when another first bit having value "1" is included in the eight neighbor bits of the first bit having value "1", the other first bit having value "1" is processed before the bit to process and the other first bit is classified into an SP pass, the other first bit having value "1" is significant. Otherwise, that is, if the other first bit having value "1" is processed after the bit to process or if the other first bit is processed before the bit to process and the pass information of the other first bit is classified into pass other than SP pass, the other first bit having value "1" is non-significant.

Magnitude Refinement (MR) Pass:

If the bit of a weblet co-efficient to process is significant, the bit of the weblet co-efficient is classified into this MR pass.

Clean-Up (CL) Pass:

The bit of a weblet coefficient that is not classified into the SP pass and MR pass is classified into this CL pass.

FIG. 3A explains the summary of the conventional bit modeling process.

Figure 3B:
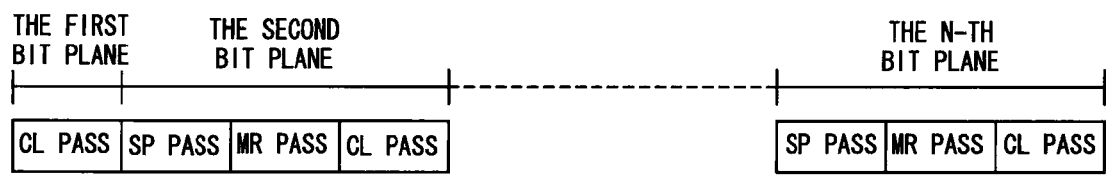
FIG. 3B explains the summary of the conventional bit modeling process (No. 2)

In the conventional bit modeling process, bit planes are processed from the MSB side to the LSB side one by one. The significant RAM 21 shown in FIG. 3A stores a significant state corresponding to each bit in the bit plane to process. Then, as shown in FIG. 3B, the SP pass of the bit plane and a context is generated based on the determined pass information. Then, its MR pass information is determined and a context is generated based on the determined pass information. Then, its CL pass information is determined and a context is generated based on the determined pass information. However, in the bit plane located the utmost MSB side, only the CL pass information is determined and only a context is generated based on the determined pass information.

Specifically, the SP encoder 22 shown in FIG. 3A inputs the bit to process of a weblet co-efficient and also obtains the significant state of the bit to process and the significant state of the eight neighbor bits of the bit to process from the significant RAM 21. If the eight neighbor bits includes at least one significant bit, the SP encoder 22 determines the pass information of the bit to process to be an "SP pass" and also generates a context using the determined pass information and the eight neighbor significant state.

The MR encoder 23 inputs the bit to process of a weblet co-efficient and also obtains the significant state of the bit to process from the significant RAM 21. If the significant state of the bit is "significant", it determines the pass information of the bit to be an "MS pass". The MR encoder 23 generates a context using the determined pass information and the eight neighbor significant state.

The CL encoder 23 determines a bit of the weblet co-efficient that is classified into neither SP nor MP passes to be a "CL pass" and generates a context using the determined pass information and the eight neighbor significant state.

The description returns to this referred embodiment.

As described above, the significant state and the SP pass are related to each other and affects the determination of the other. Then, these significant state and SP pass are amounts to be defined depending on the processing order of a bit. Thus, the process related to the SP pass is more complex than the other processes of the entire bit modeling process.

This preferred embodiment defines the type information that is close to a significant state and can be more easily classified than the significant state information. Then, it calculates the type information of each bit of a weblet co-efficient. The calculated type information is buffered in a buffer. Then, the eight neighbor significant state of the bit to process is temporarily generated using the type information of a bit to process, the type information of the eight neighbor bits of the bit to process and the pass information of bits processed before the bit to process among the eight neighbor of the bit to process, and the pass information of the bit to process is determined based on the generated eight neighbor significant state and the type information of the bit to process.

Then, the eight neighbor significant state of the bit to process is temporarily generated again after several cycles, and the context of the bit to process is generated using the generated significance information, the pass information and the type information. Thus, in this preferred embodiment, the entire bit modeling process is prevented from delaying due to the process related to the SP pass.

Figure 4:
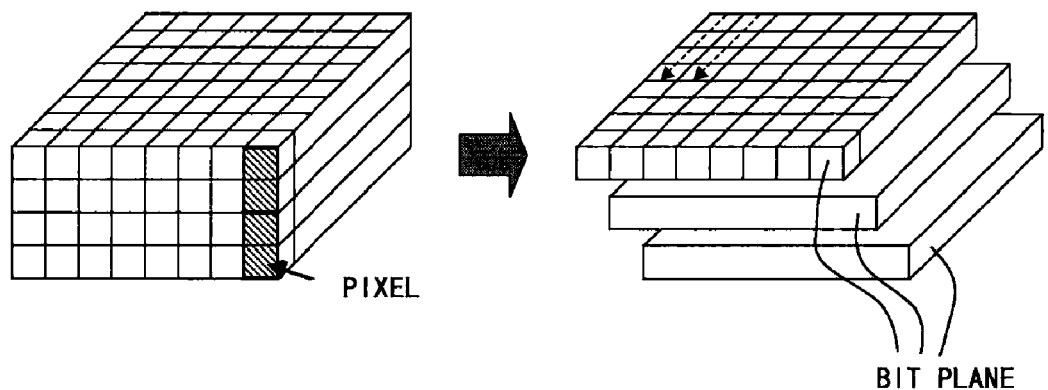
FIG. 4 is a perspective view indicating a code block.

The bit modeling process is performed for each code block as shown in FIG. 4. This code block is a rectangular parallelepiped in which bits of the wavelet co-efficient are hierarchically deposited in its depth direction. This code block is divided into bit planes in which bits with the same depth of the weblet co-efficient are collected.

Figure 5:
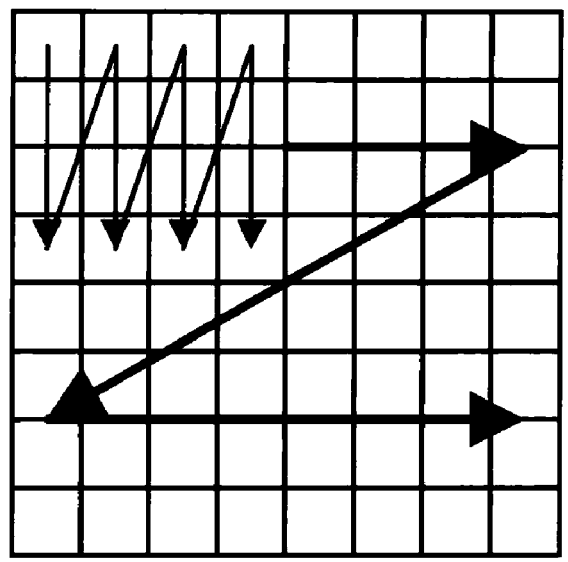
FIG. 5 shows a scanning order on a bit plane.

When the bit modeling process is applied to each bit plane, as shown in FIG. 5, four bits are processed from a bit at the upper left corner in the vertical direction (downward). Then, the process moves to a bit immediately right to the left corner bit and subsequent four bits are processed from there in the vertical direction (downward). In this way, bits are processed downward four by four with bits on the top line in a bit plane as the staring point up to the right end. Then, four bits from the fifth bit from the upper left corner of the bit plane are processed downward. Then, the process moves to a bit immediately right to the fifth bit from the upper left corner and subsequent four bits are processed from there downward. By repeatedly scanning four bits, bits in one bit plane are sequentially processed.

In order words, a bit plane is divided into such bar stripes with the width of four bits and by sequentially scanning the stripes, the bit modeling process of the bit plane is performed.

Figure 6:
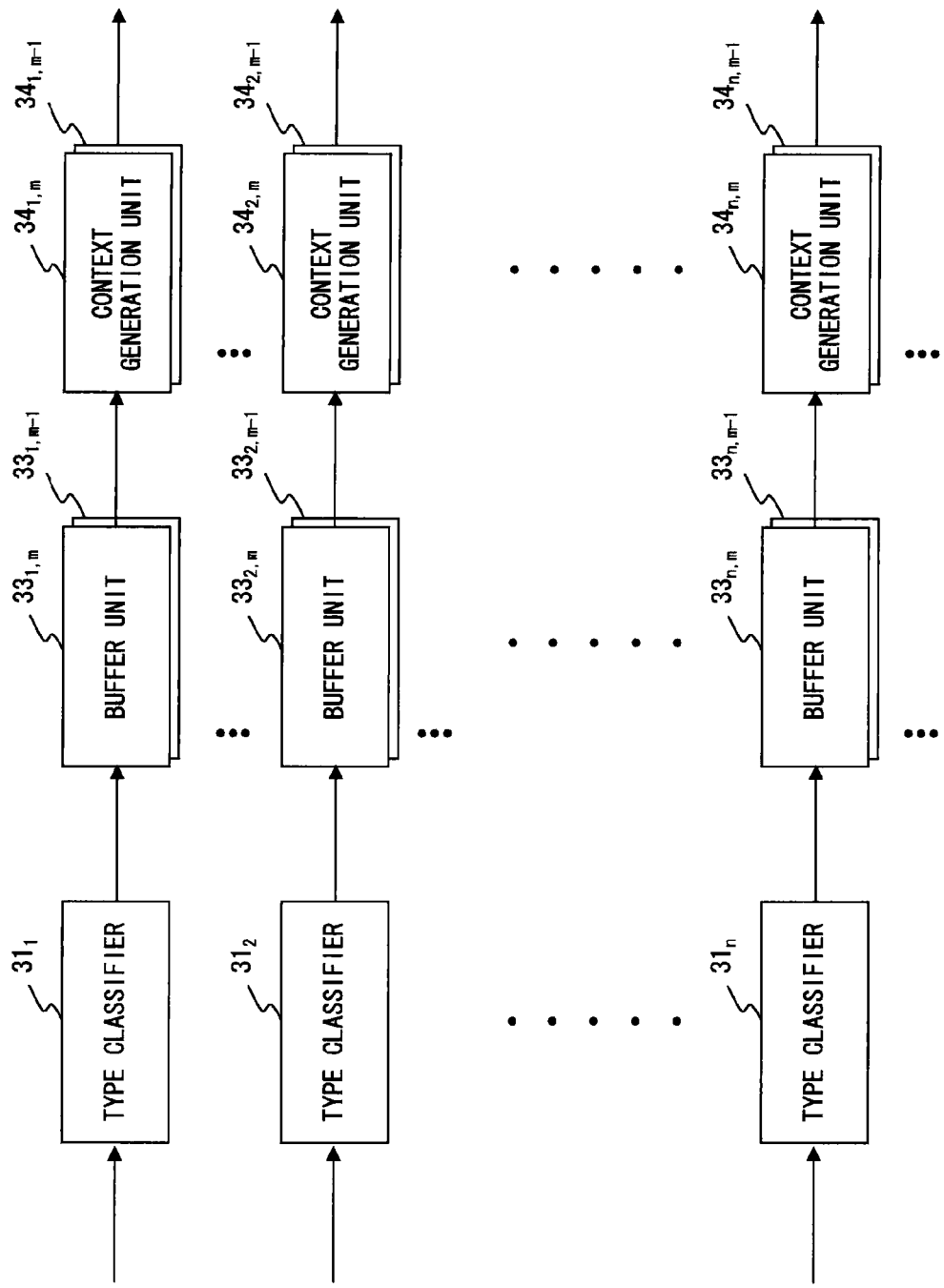
FIG. 6 shows the comprehensive configuration of the bit modeling operator in one preferred embodiment of the present invention.

FIG. 6 shows the comprehensive configuration of the bit modeling operator in one preferred embodiment of the present invention.

In FIG. 6, the bit modeling operator 30 comprises type classifiers $31_1$, $31_2$, $31_3$, . . . , $31_n$ (n=number of stripes constituting a bit plane) for inputting each bit of a weblet co-efficient in the depth direction in parallel outputted from the corresponding stripe of each bit plane constituting a code block and outputting type information of each bit, buffer units $33_{1,m}$, $33_{1,m-1}$, . . . , $33_{1,0}$, $33_{2,m}$, $33_{2,m-1}$, . . . , $33_{2,0}$, $33_{3,m}$, $33_{3,m-1}$, . . . , $33_{3,0}$, . . . , $33_{n,m}$, $33_{n,m-1}$, . . . , $33_{n,0}$ for buffering the type information outputted from each type classifier and also determining pass information corresponding to the buffered type information and context generation units $34_{1,m}$, $34_{1,m-1}$, . . . , $34_{1,0}$, $34_{2,m}$, $34_{2,m-1}$, . . . , $34_{2,0}$, $34_{3,m}$, $34_{3,m-1}$, . . . , $34_{3,0}$, . . . , $34_{n,m}$, $34_{n,m-1}$, . . . , $34_{n,0}$ for generating a context corresponding to the type information, using the type information and pass information that are outputted from each buffer unit. The weblet coefficient is assumed to be (m+1) bits. The starting time of the process of inputting each bit of the weblet co-efficient in the depth direction in parallel of the type classifier can also be slid, according to the position of the relevant stripe in the bit plane.

Specifically, if bits which are included in the eight neighbor bits of the bit corresponding to a type information of a stripe to be processed by the buffer unit and the bits to be processed before the corresponding bit obtained from a stripe immediately before the stripe to be processed when calculating the eight neighbor significant states of the type information, the starting time of the input process is slid for each type classifier (for each stripe) in such a way that the pass information of the bits to be processed before the corresponding bit are already determined in the stripe immediately before the stripe to be processed.

Figure 7:
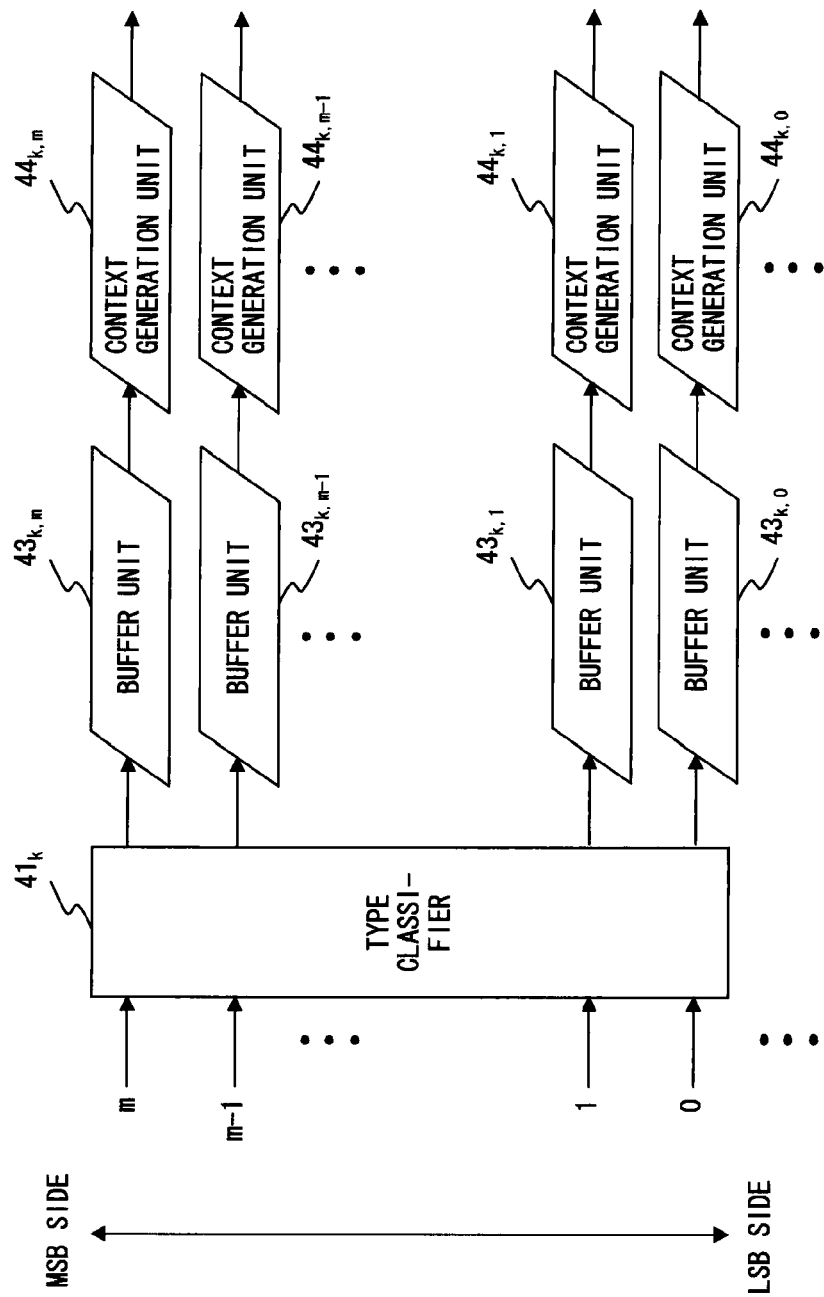
FIG. 7 shows a unit for processing one stripe, of the units shown in FIG. 6.

FIG. 7 shows a unit for processing one stripe, of the units shown in FIG. 6. FIG. 7 corresponds to the case where any line viewed from top in FIG. 6 is viewed from side.

In FIG. 7, a type classifier $41_k$ inputs each bit of the weblet co-efficient in the depth direction in parallel and outputs the type information of each bit.

The type classifier $41_k$ calculates the type information for each bit of the weblet co-efficient (m, m−1, . . . , 1, 0) inputted whose starting time is slid for the prescribed amount, according to the position on a bit plane of a stripe for this unit to process (in this case, the k-th stripe in the bit plane).

As shown in FIG. 8A, the type classifier $41_k$ determines the type information for each inputted bit based on which the relevant bit of the weblet co-efficient is, the first "1" bit (type "Y"), a bit located further on the MSB side than the first "1" bit (type "X"), a bit located further on the LSB side than the first "1" bit by one bit (type "Z'") or a bit located further on the LSB side than the bit by one bit (type "Z").

FIG. 8B shows the hardware configuration of the type classifier $41_k$.

In FIG. 8B, the type classifier $41_k$ comprises type selection units $47_{k,m}$, $47_{k,m-1}$, . . . , $47_{k,0}$.

The type selection unit $47_{k,m}$ receives type information "X" as the initial value and the utmost MSB side bit of the weblet coefficient (the m-th bit) as input and outputs the type information of the utmost MSB side bit of the weblet coefficient. The output of the type selection unit $47_{k,m}$ is buffered in the latter stage stripe buffer and also is inputted to the type selection unit $47_{k,m-1}$ for processing a bit located further on the LSB side than the utmost MSB side bit by one bit ((m−1)th bit).

The type selection unit $47_{k,m-1}$ inputs the output of the type selection unit $47_{k,m}$ and the (m−1)th bit and outputs the type information of the (m−1)th bit.

Thus, the type information of up to the utmost LSB side bit (0-th bit) is outputted.

FIG. 8C is a table for showing logic built in each type selection unit shown in FIG. 8B.

As shown in FIG. 8C, if an inputted bit is "0" when the former stage output is "X", "X" is outputted. If the inputted bit is "1", "Y" is outputted.

If the former stage output is "Y", "Z'" is outputted regardless of the inputted bit value. If the former stage output is "Z'", "Z" is outputted regardless of the inputted bit value. If the former stage output is "Z", "Z" is outputted regardless of the inputted bit value.

In this way, in the type classification process, a code block is vertically divided and each bit of the corresponding stripe of each bit plane is processed in the depth direction in parallel. Simultaneously, in the buffer process and after, the code block is horizontally divided and bit planes are processed in parallel. The starting time of the type classification process is slid in advance according to the position of each stripe included in each bit plane so that the processing order described later may not be disturbed, and stripes in the bit plane are also processed almost in parallel. Thus, a high-speed bit modeling process can be realized.

Figure 9:
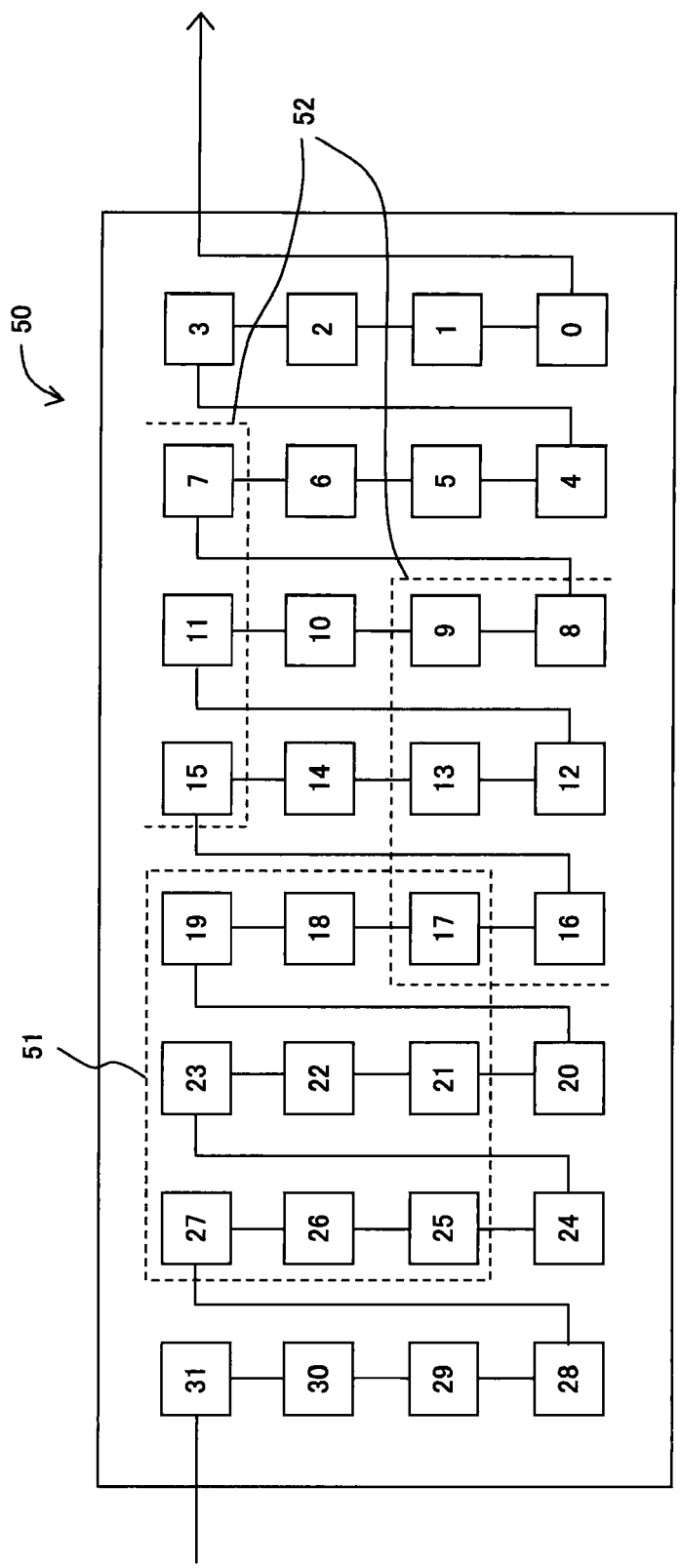
FIG. 9 shows the detailed configuration of the stripe buffer of the buffer unit.

FIG. 9 shows the detailed configuration of the stripe buffer of the buffer unit.

A stripe buffer 50 buffers type information corresponding to a plurality of consecutive bits in processing order (first-in first-out (FIFO)). This stripe buffer 50 is composed of a plurality (32 in FIG. 9; usually multiple of four) of delayers (indicated by quadrangle in FIG. 9) connected in chains.

Figure 10A:
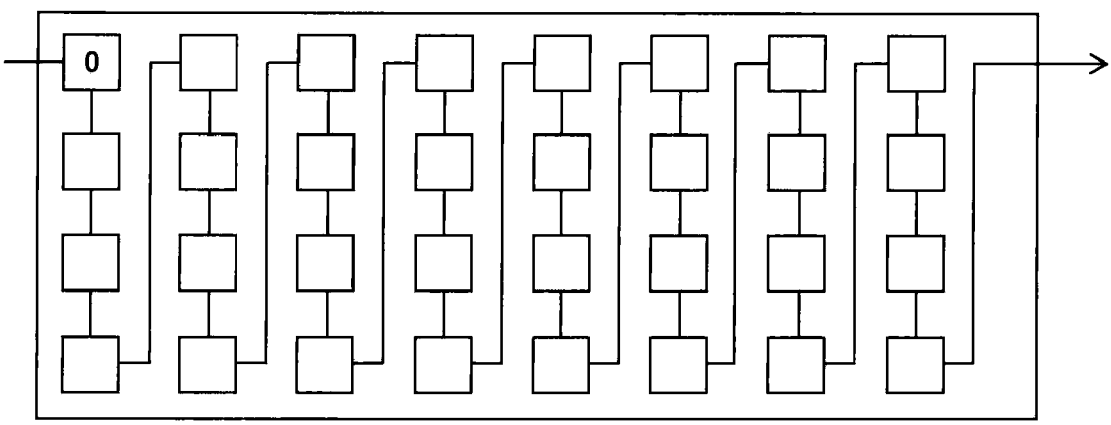
FIG. 10A explains the state in which type information is stored in the stripe buffer (No. 1)
Figure 10B:
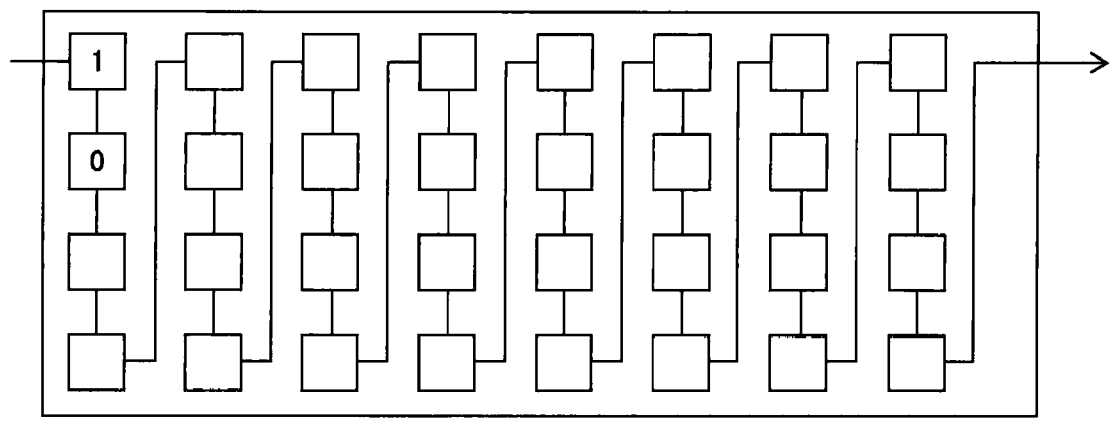
FIG. 10B explains the state in which type information is stored in the stripe buffer (No. 2)

As shown in FIG. 10A, type information "0" corresponding to a bit processed by the type classifier (this number is sometimes used as the identifier of data stored in the delayer and is sometimes used as the identifier of the delayer itself) is inputted to the leading delayer in the first cycle, and in the second cycle, as shown in FIG. 10B, the type information latched in the leading delayer is latched on the second delayer. Simultaneously, the type information "1" corresponding to a subsequent bit is latched on the leading delayer.

Thus, for example, in the 32nd cycle, as shown in FIG. 9, 32 pieces of type information "0"~"31" are latched on the stripe buffer 50.

In FIG. 9, pass information is determined for bits (type information) latched by a delayer at the center of the area indicated by a reference numeral 51 in FIG. 9.

A context is generated for bits (type information) latched by a delayer at the center of the area indicated by a reference numeral 52 in FIG. 9.

FIG. 11A shows one example of the bits of three consecutive stripes on a bit plane. In this example, a target bit plane has the width of eight bits in the right and left direction. A bit included in two lines at the center of a stripe in FIG. 11A is a bit whose eight neighbor bits are included in the stripe when the bit is processed as indicated by reference numeral 61 in FIG. 11B. When such a bit is processed, a bit to be processed before the bit to process, of bits included the eight neighbor bits of the bit to process (pre-process bit) and a bit to be processed after the bit to process (post-process bit) are determined according to processing order in the stripe. For example, in the area indicated by reference numeral 61 in FIG. 11B, "36", "37", "38" and "40" are the pre-process bits of the bit to process "41", and "42", "44", "45" and "46" are the post-process bits.

However, a bit included in two lines (top line or bottom line) at each end of a stripe in FIG. 11A is a bit whose eight neighbor bits spread between the stripes when the bit is processed as indicated by reference numerals 62 and 63 in FIG. 11B. When such a bit is processed, there are the following two cases.

1. In the Case Where a Part of the Eight Neighbor Bits is Included in the Previous Stripe In this case, a bit included in the pre-stripe (here, a stripe containing three of the eight neighbor bits is called a "pre-stripe") is processed before a bit in the stripe containing the bit to process. Therefore, the three bits included in the previous stripe, of the bits included in the eight neighbor bits of the bit to process is processed before the bit to process. For example, in the area indicated by the reference numeral 62 in FIG. 11B, "19", "23", "27", "48" and "49" are the pre-process bits of the bit to process "52", and "53", "56" and "57" are the post-process bits.

2. In the Case Where a Part of the Eight Neighbor Bits is Included in the Subsequent Stripe In this case, a bit included in the post-stripe (here, a stripe containing three of the eight neighbor bits is called a "post-stripe") is processed after a bit in the stripe containing the bit to process. Therefore, the three bits included in the previous stripe, of the bits included in the eight neighbor bits of the bit to process is processed after the bit to process. For example, in the area indicated by the reference numeral 63 in FIG. 11B, "46", "47", and "50" are the pre-process bits of the bit to process "51", and "54", "55", "76", "80" and "84" are the post-process bits.

FIG. 12A shows the state in which type information of each bit shown in FIG. 11A is stored in the stripe buffers 651, 652 and 653.

FIG. 12B shows how the process areas indicated by the reference numerals 61, 62 and 63 in FIG. 11B are disposed on the stripe buffer.

The areas indicated by the reference numeral 61 in FIG. 11B (eight neighbor bits of the bit to process "41") are also stored in an area 66 in one stripe buffer in FIG. 12B.

However, the process area spread between two stripes in FIG. 11B (eight neighbor bits of bit "52" and eight neighbor bits of bit "51") is divided between two stripe buffers and stored in FIG. 12B. For example, the type information of the bits in the area indicated by the reference numeral 62 in FIG. 11B is stored in an area $67_b$ in a stripe buffer $65_1$ and an area $67_a$ in a stripe buffer $65_2$, and the type information of bits in an area indicated by the reference numeral 63 in FIG. 11B is stored in an area $68_a$ in a stripe buffer $65_2$ and an area $68_b$ in a stripe buffer $65_3$.

In other words, if the type information of the eight neighbor bits of the type information to process is used when determining the pass information of the type information to process, buffered in a stripe buffer, at least its part must be obtained from a neighbor stripe buffer, as requested. The same applies to the pass information of the pre-process used to determine pass information.

Figure 13:
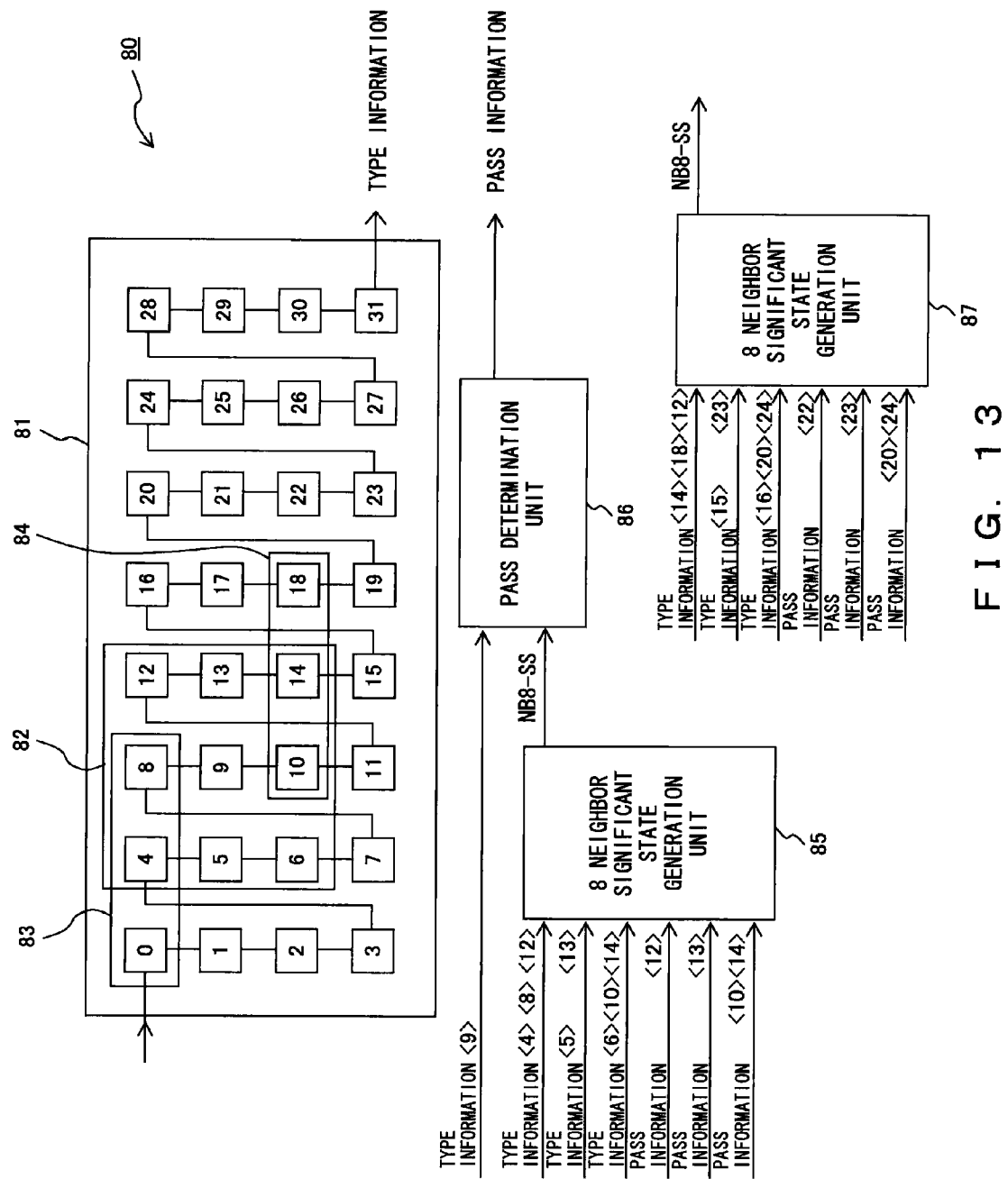
FIG. 13 shows the configuration of the buffer unit.

FIG. 13 shows the configuration of the buffer unit 80. As shown in FIG. 13, the buffer unit 80 comprises a stripe buffer 81, eight-neighbor significant state generation units 85 and 87 and a pass determination unit 86.

The pass determination unit 86 applies a pass determination process to the type information latched on a delayer at the center of an area 82 in a stripe buffer 81.

In the pass determination process, the process is not applied to a bit whose type information is classified into "X". This is because a bit whose type information is "X" is always classified into the "CL pass". In the pass determination process, the pass information of a bit whose type information is "Z" or "Z'" is determined to be the "MR pass". The pass information of a bit whose type information is not any of "X", "Z" and "Z'" and whose eight-neighbor significant states all is "0 (non-significant)", that is, a bit whose type information is "Y" and whose eight-neighbor significant states all are "0" is determined to be the "CL pass".

The pass information of the remaining, that is, a bit whose type information is "Y" and at least one of whose eight-neighbor significant states is "1" is determined to be the "SP pass".

Thus, in the pass determination process, since the eight-neighbor significant states of the bit to process is referenced, as shown in FIG. 13, the eight-neighbor significant state generation unit 85 generates the eight-neighbor significant states of the bit to process.

Actually, if the type information of the bit to process is "Y", that is, if the value of the bit viewed from the MSB side first changes from "0" to "1" in the bit plane, the eight-neighbor significant state generation unit 85 generates the eight-neighbor significant states presuming its use in the determination of the pass information.

For example, if the type information of a delayer "9" shown in FIG. 13 is "Y", the eight-neighbor significant state generation unit 85 generates the eight-neighbor significant states of the bit to process, referring to a table as shown in FIG. 14A or 14B.

FIG. 14B shows the bit to process "C" and its eight neighbor bits "NB(0)"~"NB(7)".

FIG. 14A is a table for determining the significance/non-significance of eight neighbor bits of a bit "C" to process shown in FIG. 14B, based on the type information of the eight neighbor bits, the information about each of the eight neighbor bits, indicating whether each of the eight neighbor bits is to be processed before or after the bit to process. As clearly seen from this table, if the type information of a bit included in the eight neighbor bits is "X", the significant state of the bit is "non-significant" regardless of the processing order. If the type information of a bit included in the eight neighbor bits is "Z" or "Z'", the significant state of the bit is "significant" regardless of the processing order. If a bit included in the eight neighbor bits is processed after the bit to process "C" when the type information of the bit is "Y", the significant state of the bit is "non-significant".

If a bit included in the eight neighbor bits is processed before the bit to process "C" and the pass information of the previously processed bit is the "SP pass", when the type information of the previously processed bit is "Y", the significant state of the previously processed bit is "significant". If the pass information of the previously processed bit is a "pass other than the SP pass", the significant state of the previously processed bit is "non-significant". It can be said that the table shown in FIG. 14A is built in the eight-neighbor significant state generation units 85 and 87 shown in FIG. 13.

Figure 15:
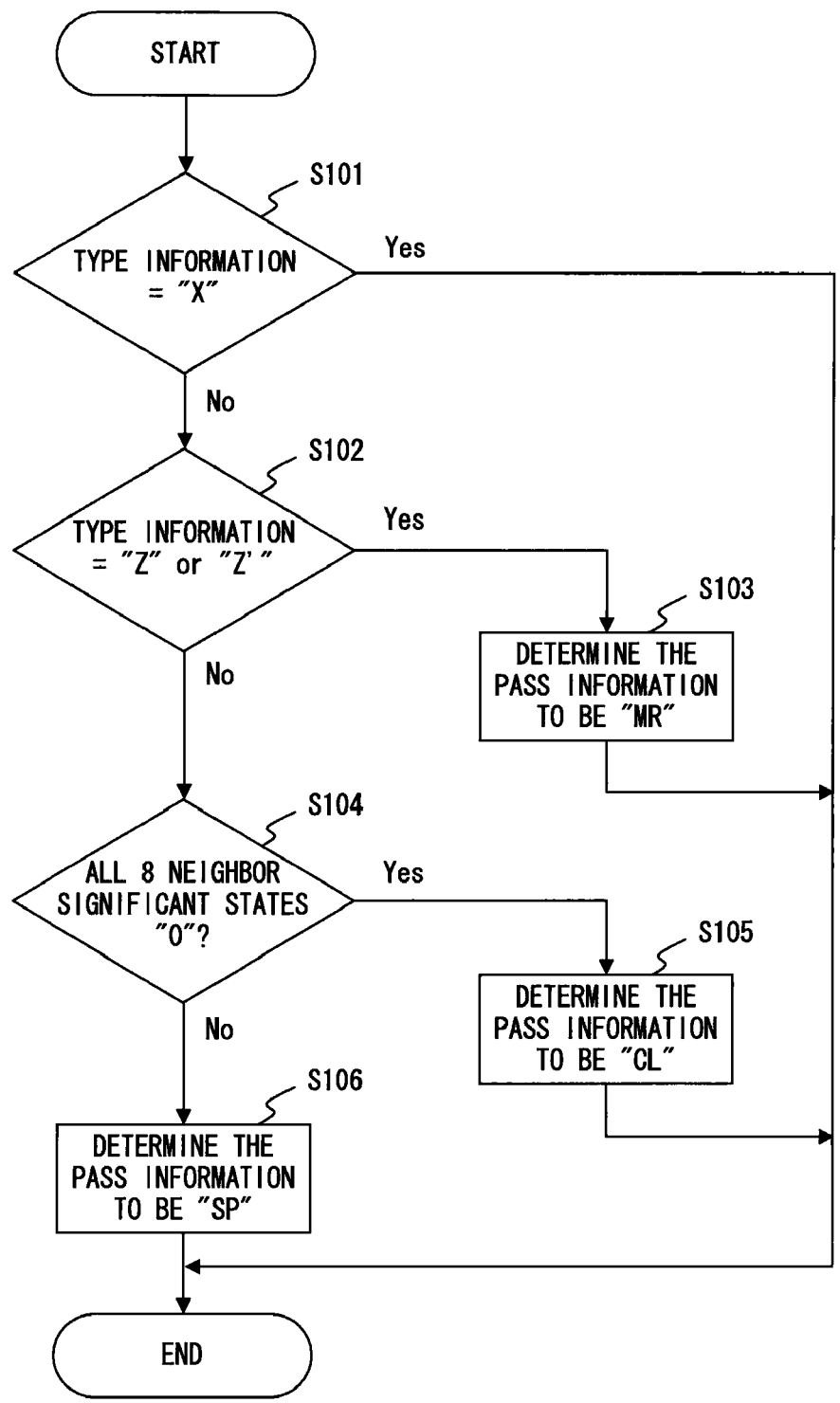
FIG. 15 is a flowchart showing the pass determination process of the pass determination unit.

FIG. 15 is a flowchart showing the pass determination process executed by the pass determination unit 86.

In FIG. 15, firstly in step S101, the pass determination unit 86 determines whether the type information of a bit to process is "X" (value latched on the delayer "9").

If in step S101 it is determined that the type information of the bit to process is "X", the series of processes terminate. In this case, the type information of the bit to process is kept initialized.

If in step S101 it is not determined that the type information of the bit to process is not "X", in step S102 it is determined whether the type information is "Z" or "Z'".

If in step S102 it is determined that the type information is "Z" or "Z'", in step S103 the type information of the bit to process is determined to the "MR pass" and the series of processes terminate.

If in step S102 it is determined that the type information of the bit to process is neither "Z" nor "Z'", in step S104 it is determined whether the eight neighbor significant states (omitted as "8NB-SS" in FIG. 13) generated by the eight-neighbor significant state generation unit 85 shown in FIG. 13 all are "0 (non-significant)".

If in step S104 it is determined that the eight neighbor significant states all are "0 (non-significant)", in step S105 the type information of the bit to process is determined to be the "CL pass" and the series of processes terminate.

If in step S104 it is determined that there is at least one "1 (significant)" bit in the eight neighbor significant states, in step S106 the type information of the bit to process is determined to be the "SP pass" and the series of processes terminate.

In this preferred embodiment, the output of type information from a stripe in the bit plane to a stripe buffer is slid (delayed) by eight cycles and started after the type information of immediately previous stripe is outputted to a stripe buffer immediately before the relevant stripe.

Thus, even if the eight neighbor significant states must be referenced when determining the pass information of the bit to process, it is ensured that the pass information of the pre-process bits used to generate the eight neighbor significant states is already determined.

The pass determination unit 86 shown in FIG. 13 determines the pass information of the type information of the delayer "9" at the center of the area 82 in the stripe buffer 81. The bit referenced as eight neighbor bits of the type information of the bit to process by the eight neighbor significant state generation unit 85 is modified according to whether a bit corresponding to the type information latched by this delayer "9" is located on two lines at the center of a stripe or on two lines at the end touching another stripe.

An area 84 in the stripe buffer 81 is an area indicated by three bits of the eight neighbor bits transferred to a stripe buffer immediately after (under) the stripe buffer 81, and an area 83 is an area indicated by three bits of the eight neighbor bits transferred to a stripe buffer immediately before (above) the stripe buffer 81.

In other words, if the bit to process touches the upper stripe, type information (and its pass information) received from a position corresponding to the area 84 of the immediately above stripe buffer is selected. If the bit to process touches the lower stripe, type information (and its pass information) received from a position corresponding to the area 83 of the immediately under stripe buffer is selected.

The eight neighbor selection process performed on the input side of the eight neighbor significant state generation unit 85 shown in FIG. 13 is described below with reference to FIGS. 12A and 16.

Type information in the delayer "54" of the stripe buffer 65$_2$ shown in FIG. 12A is processed. In this case, as shown in FIG. 16, the area 82$_a$ of the delayers "59", "55" and "51", the area 82$_b$ of the delayers "58", "54" and "50", the area 82$_c$ of the delayers "57", "53" and "49" and the area 83' of the delayers "95", "91" and "87" which receive type information from the immediately under stripe buffer 65$_3$ and the area 84' of the delayers "21", "17" and "13" which receive type information from the immediately above stripe buffer 65$_1$ are candidates for determining eight neighbor areas of the delayer "54".

In other words, if a bit corresponding to the type information of the delayer "54" shown in FIG. 12A is included in two lines at the center of the stripe, the combined area of areas 82$_a$, 82$_b$ and 82$_c$ shown in FIG. 16 stores the type information of eight neighbor bits corresponding to the type information of the delayer "54".

If a bit corresponding to the type information of the delayer "54" shown in FIG. 12A is included in the top line of the stripe, the combined area of areas 82$_a$, 82$_b$ and 84' shown in FIG. 16 stores the type information of the eight neighbor bits corresponding to the type information of the delayer "54".

If a bit corresponding to the type information of the delayer "54" shown in FIG. 12A is included in the bottom line of the stripe, the combined area of areas 82$_b$, 82$_c$ and 83' shown in FIG. 16 stores the type information of the eight neighbor bits corresponding to the type information of the delayer "54".

Figure 17:
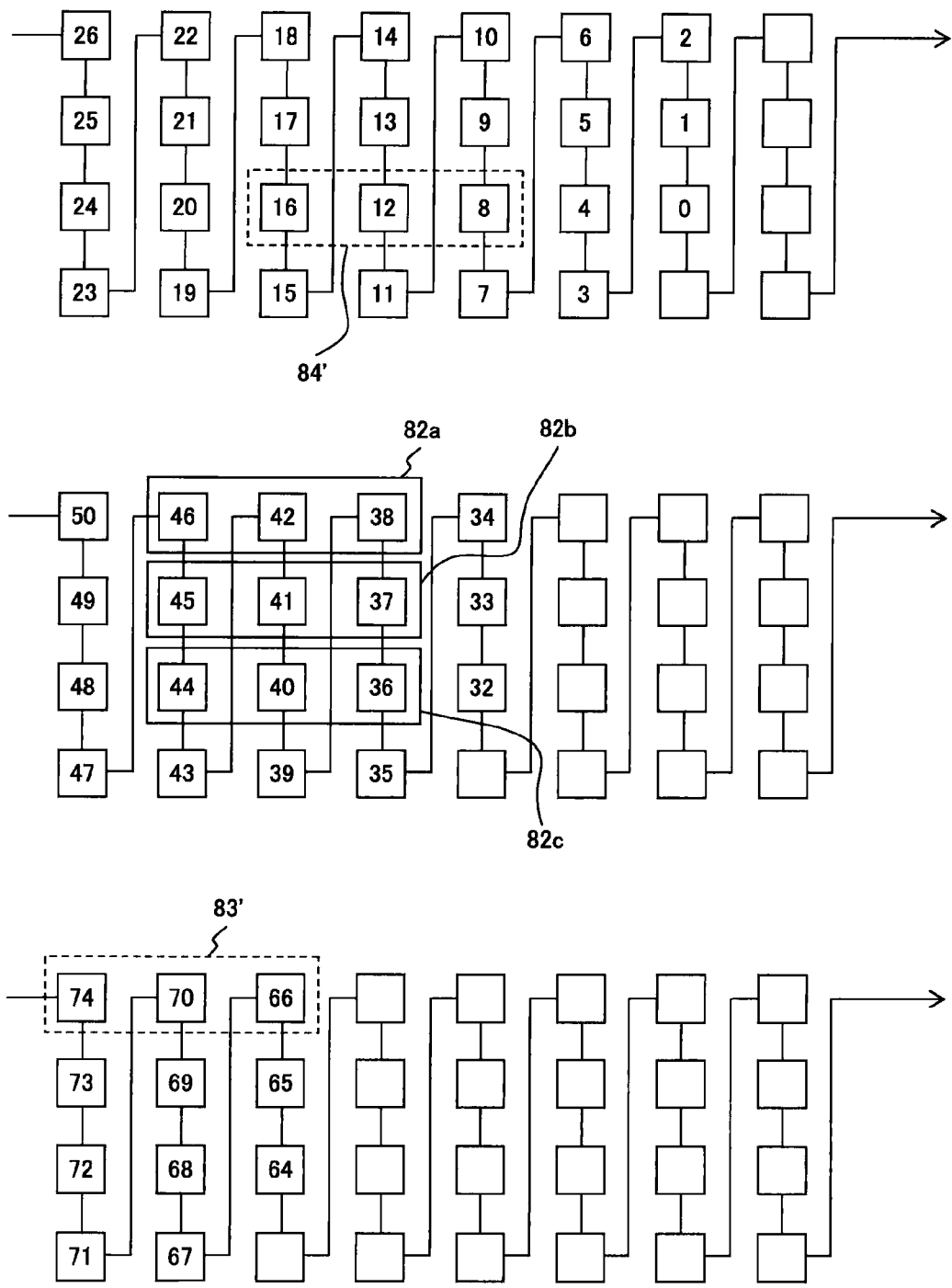
FIG. 17 shows an example of eight selected neighbor bits (No. 1)
Figure 19:
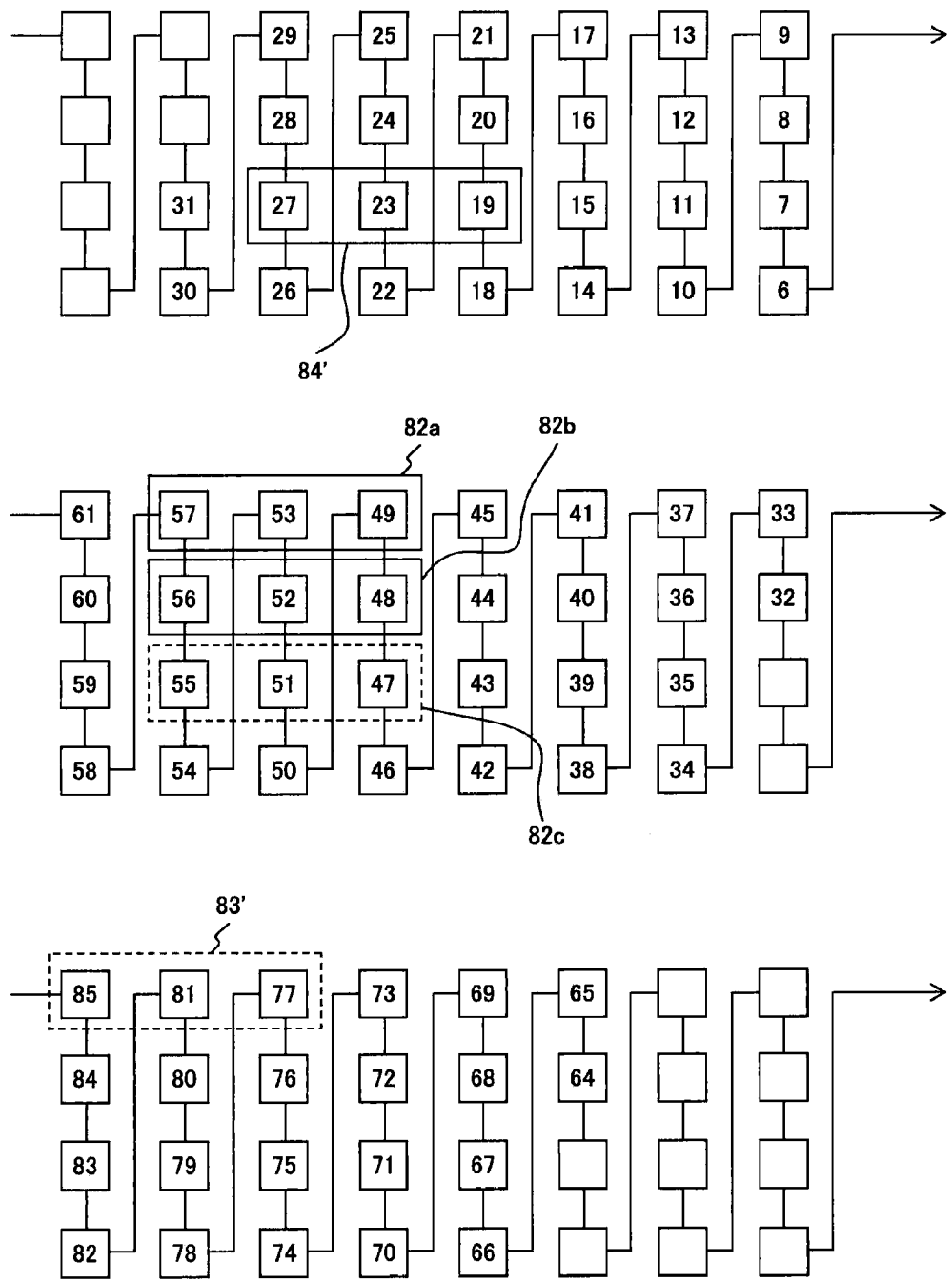
FIG. 19 shows an example of eight selected neighbor bits (No. 3)

FIGS. 17, 18 and 19 show areas used to store the type information of the eight neighbor bits in the case where the bits "41", "51" and "52" shown in FIG. 11B become bits to process in the stripe buffer.

In the cycle shown in FIG. 17, type information corresponding to the bit "41" shown in FIG. 11B is latched on the delayer to process of the stripe buffer 65$_2$. In this case, since the bit "41" is included in two lines at the center of the stripe, the combined area of areas 82$_a$, 82$_b$ and 82$_c$ stores the type information of the eight neighbor bits corresponding to the type information to process.

In the cycle shown in FIG. 18, type information corresponding to the bit "51" shown in FIG. 11B is latched on the delayer to process of the stripe buffer 65$_2$. In this case, since the bit "51" is included in the bottom line of the stripe, the combined area of areas 82$_b$, 82$_c$ and 83' stores the type information of the eight neighbor bits corresponding to the type information to process.

In the cycle shown in FIG. 19, type information corresponding to the bit "52" shown in FIG. 11B is latched on the delayer to process of the stripe buffer 65$_2$. In this case, since the bit "52" is included in the top line of the stripe, the combined area of areas 82$_a$, 82$_b$ and 84' stores the type information of the eight neighbor bits corresponding to the type information to process.

In FIG. 13, there are two eight-neighbor significant state generation units. This corresponds to two delayers for storing type information to process in the stripe buffer 81 shown in FIG. 13. Although not clearly seen from FIG. 13, the eight neighbor significant state generation unit 87 also generates the eight neighbor significant states of the delayer "19". The eight neighbor significant states generated here are used in the context generation unit at the latter stage.

Figure 20:
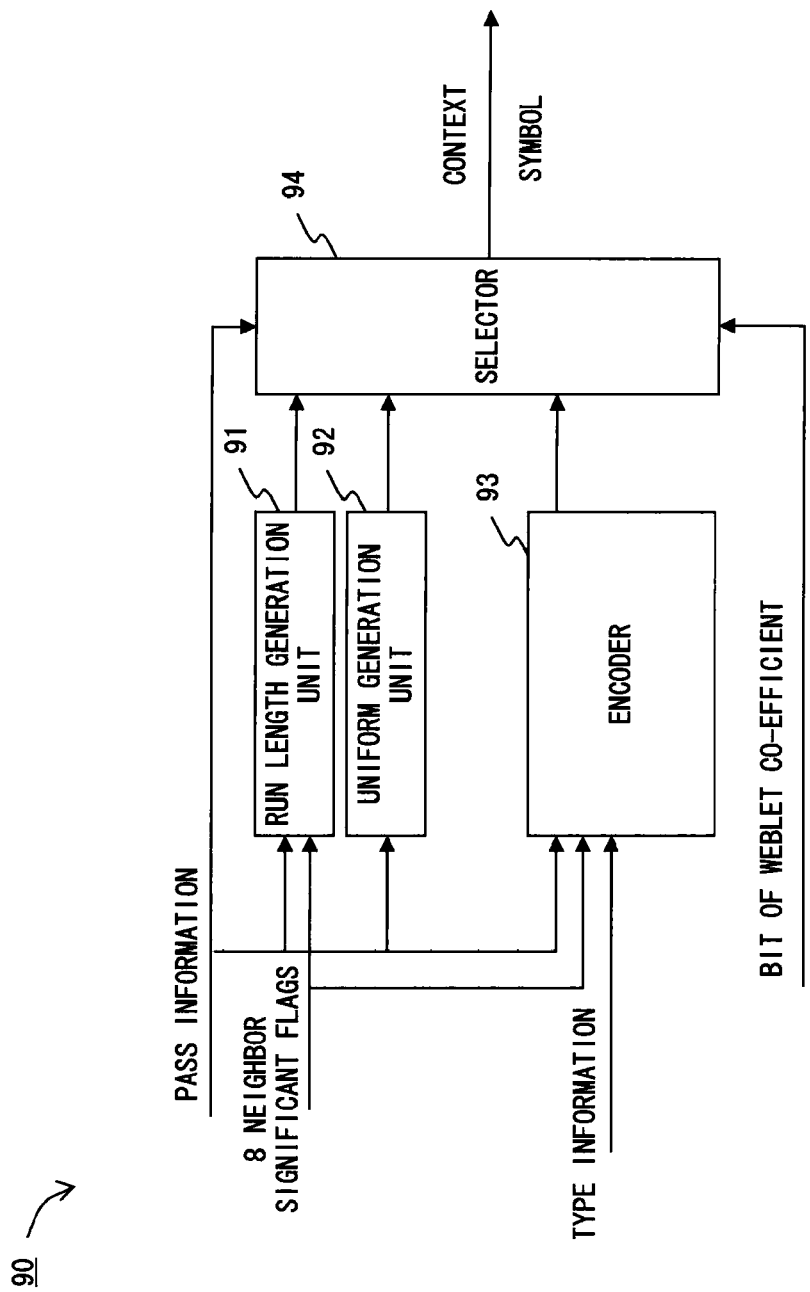
FIG. 20 shows the configuration of the context generation unit.

FIG. 20 shows the configuration of the context generation unit.

In FIG. 20, a context generation unit 90 comprises a run length generation unit 91 for generating a context corresponding to the run length when inputting the pass information and eight neighbor significant states and detecting a pattern corresponding to the run length, a uniform generation unit 92 for generating a context corresponding to a uniform when inputting the pass information and eight neighbor significant states and detecting a pattern corresponding to the uniform, an encoder 93 for inputting type information, pass information corresponding to the type information and the eight neighbor significant states of the type information bit and generating the context of the bit and a selector 94 for inputting the pass information, the output of the run length generation unit 91, the output of the uniform generation unit 92, the output of the encoder 93 and the corresponding bit of the code block, selecting a context, based on the built-in logic (run length has priority over a corresponding CL pass and so on) and outputting the selected context and a symbol (bit of a weblet coefficient corresponding to the context).

For example, when "X" is inputted as type information, the encoder 93 regards the pass information of the bit as the "CL pass" and generates a context.

The encoder 93 reflects the difference between type information "Z" indicating the first MR pass and type information "Z" indicating the second or later MR pass and generates a context.

What is claimed is:

1. An encoding device for outputting encoded data, based on a weblet co-efficient obtained by weblet transform, comprising:

a type determination unit for inputting each bit of the weblet co-efficient in a depth direction in parallel and determining type information indicating which the bit is, the first "1" bit when viewed from MSB side, a bit located further on the MSB side than the first "1" bit or a bit further located on the LSB side than the first "1" bit;

a buffer unit for buffering the determined type information of each bit for each bit depth;

a pass determination unit for determining pass information of a type information to process, of a plurality of pieces of type information, based on the plurality of pieces of buffered type information of the same depth;

a context generation unit for generating a context, based on the type information outputted from the buffer unit and the pass information determined for the outputted type information; and an arithmetic encoding unit for performing arithmetic encoding, based on the generated context.

2. The encoding device according to claim 1, wherein the pass determination unit generates significant states of eight neighbor bits of the type information to process, based on type information of the eight neighbor bits of type information to process and pass information of bits processed before the type information to process, of its eight neighbor bits, and determines pass information of the type information to process, based on the generated eight neighbor significant states and the type information to process.

3. The encoding device according to claim 1, wherein
the pass determination unit determines pass information of the type information to process to be a magnitude refinement (MR) pass if the type information to process is the type information indicating the bit (corresponding to the type information to process) is located further on a LSB side than the first "1" bit when viewed from an MSB side, determines pass information of the type information to process to be a clean-up (CL) pass if the type information to process is the first "1" bit when viewed from an MSB side and the eight neighbor significant states of the type information to process all are non-significant, and determines pass information of the type information to process to be a significance propagation (SP) pass if the type information to process is the first "1" bit when viewed from an MSB side and at least one of the eight neighbor significant states of the type information to process is significant.

4. The encoding device according to claim 1, wherein
the type determination unit is provided for each corresponding stripe of each bit plane constituting a code block,
the buffer unit, the pass determination unit and the context generation unit are provided for each bit plane and also for each stripe in the bit plane, and
a starting time of a process of inputting each bit of a weblet co-efficient in a depth direction in parallel, according to a position in a bit plane of the stripe is slid.

5. The encoding device according to claim 4, wherein
If pre-process bits of the bit corresponding to the type information processed in the pass determination unit, are obtained from a stripe immediately before a stripe corresponding to the pass determination unit when calculating eight neighbor significant states of the type information, the staring time of the process of the type determination unit is slid for each stripe in such a way that pass information of the pre-process bits are already determined in a stripe immediately before the relevant stripe.

6. The encoding device according to claim 1, wherein
the type determination unit inputs each bit of the weblet co-efficient in a depth direction in parallel and determines type information indicating which the bit is, the first "1" bit when viewed from an MSB side, a bit located further on the MSB side than the first "1" bit, a bit located further on an LSB side than the first "1" bit by one bit or a bit located further on the LSB side than the LSB side bit by one bit, and the context generation unit generates a context of the first MR pass, using type information indicating that the bit is the bit located further on an LSB side than the first "1" bit by one bit.

7. An encoding device for outputting encoded data, based on a weblet co-efficient indicated by a significant state variable obtained by weblet transform, comprising:
a type determination unit for inputting each bit of the weblet co-efficient in a depth direction in parallel and determining type information indicating which the bit is, the first significant bit when viewed from MSB side, a bit located further on the MSB side than the first significant bit or a bit further located on the LSB side than the first significant bit;

a buffer unit for buffering the determined type information of each bit for each bit depth;

a pass determination unit for determining pass information of a type information to process, of a plurality of pieces of type information, based on the plurality of pieces of buffered type information of the same depth;

a context generation unit for generating a context, based on the type information outputted from the buffer unit and the pass information determined for the outputted type information; and an arithmetic encoding unit for performing arithmetic encoding, based on the generated context.

8. An encoding method for outputting encoded data, based on a weblet co-efficient obtained by weblet transform, comprising:
a type determination step of inputting each bit of the weblet co-efficient in a depth direction in parallel and determining type information indicating which the bit is, the first "1" bit when viewed from MSB side, a bit located further on the MSB side than the first "1" bit or a bit further located on the LSB side than the first "1" bit;

a buffering step of buffering the determined type information of each bit for each bit depth;

a pass determination step of determining pass information of a type information to process, of a plurality of pieces of type information, based on the plurality of pieces of buffered type information of the same depth;

a context generation step of generating a context, based on the type information outputted from the buffer unit and the pass information determined for the outputted type information; and an arithmetic encoding step of performing arithmetic encoding, based on the generated context.

9. The encoding method according to claim 8, wherein
in the pass determination step, significant states of eight neighbor bits of the type information to process are generated, based on type information of the eight neighbor bits of type information to process and pass information of bits processed before the type information to process, of its eight neighbor bits, and pass information of the type information to process is determined, based on the generated eight neighbor significant states and the type information to process.

10. The encoding method according to claim 8, wherein
in the pass determination step, if the type information to process is the type information indicating the bit (corresponding to the type information to process) is located further on a LSB side than the first "1" bit when viewed from an MSB side, pass information of the type information to process to be a MR pass, if the type information to process is the first "1" bit when viewed from an MSB side and the eight neighbor significant states of the type information to process all are non-significant, pass information of the type information to process is determined to be a CL pass, and if the type information to process is the first "1" bit when viewed from an MSB side and at least one of the eight neighbor significant states of the type information to process is significant, pass information of the type information to process is determined to be a SP pass.

11. The encoding method according to claim 8, wherein
the type determination step is executed for each corresponding stripe of each bit plane constituting a code block, the buffering step, the pass determination step and the context generation step are executed for each bit plane and also for each stripe in the bit plane, and in the type determination step, a starting time of a process of inputting each bit of a weblet co-efficient in a depth direction in parallel is slid according to a position in a bit plane of the stripe.

12. The encoding method according to claim 11, wherein
If pre-process bits of the bit corresponding to the type information processed in the pass determination step, are obtained from a stripe immediately before a stripe corresponding to the pass determination step when calculating eight neighbor significant states of the type information, the staring time of the process of the type determination step is slid for each stripe in such a way that pass information of the pre-processed bits are already determined in a stripe immediately before the relevant stripe.

13. The encoding method according to claim 8, wherein
in the type determination step, each bit of the weblet co-efficient is inputted in a depth direction in parallel and type information indicating which the bit is, the first "1" bit when viewed from an MSB side, a bit located further on the MSB side than the first "1" bit, a bit located further on an LSB side than the first "1" bit by one bit or a bit located further on the LSB side than the LSB side bit by one bit is determined, and
in the context generation step, a context of the first MR pass is generated, using type information indicating that the bit is the bit located further on an LSB side than the first "1" bit by one bit.

* * * * *

UNITED STATES PATENT AND TRADEMARK OFFICE
CERTIFICATE OF CORRECTION

PATENT NO. : 7,742,645 B2
APPLICATION NO. : 11/550436
DATED : June 22, 2010
INVENTOR(S) : Nakamura Page 1 of 1

It is certified that error appears in the above-identified patent and that said Letters Patent is hereby corrected as shown below:

Title Page

Item (73), Assignee Information, please add a second Assignee's name as address as follows:

-- Fujitsu Devices Inc., Tokyo (JP) --.

Signed and Sealed this
Twenty-second Day of March, 2011

David J. Kappos
*Director of the United States Patent and Trademark Office*